(12) United States Patent
Ziegelmeier et al.

(10) Patent No.: US 12,145,399 B2
(45) Date of Patent: Nov. 19, 2024

(54) METHOD FOR MANUFACTURING A DECORATIVE ELEMENT HAVING A RAISED EMBOSSED VISIBLE SURFACE, AND DECORATIVE ELEMENT MANUFACTURED BY SAID METHOD

(71) Applicant: Bayerische Motoren Werke Aktiengesellschaft, Munich (DE)

(72) Inventors: Stefan Ziegelmeier, Essenbach (DE); Martin Friedrich, Unterschleissheim (DE); Dominik Rietzel, Neuried (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/808,288

(22) Filed: Nov. 9, 2017

(65) Prior Publication Data

US 2018/0065403 A1 Mar. 8, 2018

Related U.S. Application Data

(63) Continuation of application No. PCT/EP2016/068376, filed on Aug. 2, 2016.

(30) Foreign Application Priority Data

Aug. 26, 2015 (DE) ...................... 10 2015 216 325.3

(51) Int. Cl.
*B44C 3/02* (2006.01)
*B29C 59/00* (2006.01)
(Continued)

(52) U.S. Cl.
CPC ............ *B44C 3/025* (2013.01); *B29C 59/002* (2013.01); *B33Y 10/00* (2014.12); *B33Y 80/00* (2014.12);
(Continued)

(58) Field of Classification Search
None
See application file for complete search history.

(56) References Cited

U.S. PATENT DOCUMENTS 5,849,238 A 12/1998 Schmidt et al.
2005/0198874 A1* 9/2005 Wurm ................... D06C 15/00
38/1 A
(Continued)

FOREIGN PATENT DOCUMENTS

CN 102256806 A 11/2011
DE 36 07 647 A1 9/1987
(Continued)

OTHER PUBLICATIONS

Machine English translation of DE102005006541A1, accessed Nov. 26, 2019 (Year: 2005).*

(Continued)

*Primary Examiner* — Jacob T Minskey
*Assistant Examiner* — Adrianna N Konves
(74) *Attorney, Agent, or Firm* — Crowell & Moring LLP

(57) ABSTRACT

A method for manufacturing a decorative component includes providing an embossing device which has female embossing mold and male embossing mold, and providing at least one decorative material layer. The method also includes disposing the decorative material layer between the female embossing mold and the male embossing mold in such a manner that a visible surface of the decorative material layer faces the female embossing mold, and a reverse face of the decorative material layer that is opposite the visible surface faces the male embossing mold. The method also includes carrying out an embossing procedure by means of the embossing device such that the decorative material layer after the embossing procedure has a raised region on the visible surface, and opposite thereto a depressed region on the reverse face. The method also includes disposing an (Continued)

insert element for stabilizing the raised region in the depressed region.

16 Claims, 3 Drawing Sheets

(51) Int. Cl.
    *B33Y 10/00*     (2015.01)
    *B33Y 80/00*     (2015.01)
    *B44B 5/02*     (2006.01)
    *B44C 1/24*     (2006.01)
    *C14B 1/56*     (2006.01)
    *B29L 31/00*     (2006.01)

(52) U.S. Cl.
    CPC ............... *B44B 5/028* (2013.01); *B44C 1/24* (2013.01); *C14B 1/56* (2013.01); *B29L 2031/722* (2013.01)

(56) References Cited

U.S. PATENT DOCUMENTS

| | | | |
|---|---|---|---|
| 2008/0141569 | A1 | 6/2008 | Reyland |
| 2012/0015107 | A1 | 1/2012 | Schacht et al. |
| 2016/0075290 | A1* | 3/2016 | Catlin ................... B29C 64/112 428/221 |
| 2016/0325520 | A1* | 11/2016 | Berger ...................... F16S 3/08 |
| 2016/0346997 | A1* | 12/2016 | Lewis ................. B29C 67/0055 |
| 2017/0240080 | A1 | 8/2017 | Drbohlav et al. |

FOREIGN PATENT DOCUMENTS

| | | |
|---|---|---|
| DE | 10 2005 006 541 A1 | 8/2006 |
| DE | 10 2008 059 719 A1 | 6/2010 |
| DE | 10 2015 209 332 A1 | 4/2016 |
| WO | WO 2014/193961 A1 | 12/2014 |

OTHER PUBLICATIONS

Leather Hide Store—Types of Leather, https://www.leatherhidestore.com/what-type-of-leather-do-i-need, Accessed Nov. 23, 2021 (Year: 2012).*

Roques-Carmes, Thibault, et al. "Stereolithography fabrication and characterization of syntactic foams containing hollow glass microspheres." Russian Chemical Reviews 78.4 (2009): 375. (Year: 2009).*

Leather Hide Store on Archive.org (Year: 2012).*

International Search Report (PCT/ISA/210) issued in PCT Application No. PCT/EP2016/068376 dated Jan. 11, 2017 with English translation (seven pages).

German-language Written Opinion (PCT/ISA/237) issued in PCT Application No. PCT/EP2016/068376 dated Jan. 11, 2017 (seven pages).

German-language Search Report issued in counterpart German Application No. 10 2015 216 325.3 dated Jul. 22, 2016 with partial English translation (12 pages).

English Translation of Chinese-language Office Action issued in counterpart Chinese Application No. 201680025269.2 dated Jun. 4, 2019 (10 pages).

* cited by examiner

METHOD FOR MANUFACTURING A DECORATIVE ELEMENT HAVING A RAISED EMBOSSED VISIBLE SURFACE, AND DECORATIVE ELEMENT MANUFACTURED BY SAID METHOD

CROSS REFERENCE TO RELATED APPLICATIONS

This application is a continuation of PCT International Application No. PCT/EP2016/068376, filed Aug. 2, 2016, which claims priority under 35 U.S.C. § 119 from German Patent Application No. 10 2015 216 325.3, filed Aug. 26, 2015, the entire disclosures of which are herein expressly incorporated by reference.

BACKGROUND AND SUMMARY OF THE INVENTION

A method for manufacturing a decorative component having a raised embossed visible surface is specified. The decorative component can have a decorative material layer, in particular a natural material layer from leather or from veneer timber, for example. Furthermore specified is a decorative component that is manufactured by said method.

In order to be embossed, leather or textiles are usually clamped in a frame and placed under a press. The motive is subsequently embossed into the workpiece under the effect of heat and pressure. The process parameters herein control the durability of the embossing. The higher the pressure and the temperature, or the more moisture in the leather, respectively, the more durable or more detailed, respectively, the deformation of the material.

So-called propane gas dies or electrical branding dies are used for generating delicate textures in timber and/or leather. The die herein is heated to the desired temperature and is pushed into the material for a defined period of time. Concave embossings can exclusively be generated by this method. However, no raised feature of the motive in the timber is performed.

The existing methods have a multiplicity of disadvantages. In most instances, no high dimensional stability of the embossing is thus achieved, and the embossing tools used, which are usually eroded or milled from steel or brass, require a cost-intensive manufacturing process. Furthermore, no raised features of the motive are possible in timber, but concave embossings have exclusively been generated to date. The high costs of the embossing tools and the long manufacturing time of the latter lead to a limited flexibility in terms of variants. Furthermore, high inventory costs for the tools arise in the case of a large number of bespoke tools.

It is an object of at least some embodiments to specify a method for manufacturing a decorative component which has a raised embossed visible surface and high dimensional stability, the sensory properties of said decorative component being adaptable without high complexity to individual customer requirements. It is a further object of at least some embodiments to specify a decorative component that is manufactured by the method.

These and other objects are achieved by a method and by a device according to the present disclosure.

In the case of the method described herein for manufacturing a decorative component having a raised embossed visible surface, an embossing device and at least one decorative material layer are provided. The embossing device has a female embossing mold and a male embossing mold. For example, the decorative material layer can have a thickness between 0.3 mm and 6.0 mm, preferably between 0.6 mm and 5 mm.

The decorative material layer is disposed between the female embossing mold and the male embossing mold in such a manner that a visible surface of the decorative material layer faces the female embossing mold, and a reverse face of the decorative material layer that is opposite the visible surface faces the male embossing mold. An embossing procedure by means of the embossing device is subsequently carried out such that the decorative material layer after the embossing procedure has a raised region on the visible surface, and opposite thereto a depressed region on the reverse face. The raised region on the visible surface is preferably generated while the depressed region is being configured on the reverse face during the same embossing procedure. An insert element for stabilizing the raised region is subsequently disposed in the depressed region. An improved dimensional stability of the embossing, or of the raised region of the visible surface, respectively, can be achieved on account of the insert element.

A combination of raised and depressed motives including a surface texture is possible by means of the method described herein. In particular, a combination of convex and concave and/or embossed, or compressed, respectively, structures can be achieved.

In addition to the raised region on the visible surface of the decorative material layer, a further raised region and/or at least one depressed region are/is generated on the visible surface of the decorative material layer in the method described. Furthermore, a multiplicity of further and in each case preferably spatially separate raised regions can additionally be generated on the visible surface of the decorative material layer, and/or a multiplicity of further and in each case preferably spatially separate depressed regions can be generated on the visible surface of the decorative material layer. A raised and/or deep-drawn, or embossed, respectively, convex and/or concave pattern can thus be created on the visible surface of the decorative material layer. On account thereof, the design of the decorative component is individually adaptable to customer requirements. For example, the raised or depressed, respectively, regions on the visible surface can be manufactured by way of the same embossing procedure. All of the raised regions on the visible surface can preferably be stabilized by disposing an insert element, as has further been described above.

Additionally, one or a plurality of depressing embossings are generated in the visible surface of the decorative material layer. The decorative material layer in the region of the depressing embossings, perpendicular to the surface thereof, has a depth that is preferably less than in directly neighboring regions. The depressing embossings can be configured, for example, in the region of the raised region and/or in a planar region that surrounds the raised region. The depressing embossings can be generated by way of the embossing procedure by means of which the raised region on the visible surface is configured, for example. Alternatively, prior to or after said embossing procedure, the depressing embossings can be manufactured by means of one or a plurality of further embossing procedures. For example, patterns, characters, logos, or the like can be represented on the visible surface by way of the depressing embossings.

Further, the insert element has a surface contour which is adapted to the surface contour of the decorative material layer in the depressed region. In particular, a surface of the insert element that is assigned to the depressed region of the reverse face in terms of the surface contour thereof is preferably adapted to the surface contour of the depressed region. For example, the insert element can be disposed in the depressed region in such a manner that no intermediate spaces are present between the decorative material layer and the insert element once the insert element has been disposed.

Additionally, the insert element is manufactured by means of an additive production method. The insert element can be manufactured by selective laser beam smelting, selective laser sintering, stereo lithography, multi-jet fusion, continuous liquid interface production, or fused deposition modelling, for example. The insert element can be manufactured in a cost-effective manner by means of the additive production method, and the properties of the insert element can be set in a targeted manner. Alternatively, the insert element can be manufactured by means of a casting method such as, for example, silicone casting.

Further, the insert element in the interior has a multiplicity of recesses. The recesses of the insert element preferably represent cavities within the insert element. The insert element can have a cellular structure having a multiplicity of recesses, for example. The individual cells of the cellular structure herein can configured so as to be of identical size, or so as to vary depending on the compression hardness of the insert element to be achieved. The cellular structure of the insert element can be generated in particular by an additive production method. Furthermore or additionally, the recesses of the insert element can be manufactured by using glass spheres that are subsequently destroyed and are embedded in a polymer matrix, for example.

The sensory properties of the raised region of the visible surface can be advantageously adapted individually to customer requirements, for example by way of a variation in the compression hardness values. Furthermore, an improvement in terms of the ergonomic aspects of embossings, for example with a view to an application on a driver's seat, an arm rest, or a head rest, is possible.

Moreover, the insert element is fastened in the depressed region. The insert element can be adhesively bonded into the depressed region, for example. In particular the surface of the insert element that is assigned to the depressed region of the reverse face of the decorative material layer is preferably connected to the decorative material layer by means of adhesive bonding.

Further, the insert element has an elasticity modulus of less than or equal to 5.0 GPa. The insert element preferably has an elasticity modulus of less than or equal to 0.5 GPa, particularly preferably of less than or equal to 50 MPa.

Moreover, the insert element comprises a thermoplastic elastomer, or is composed of a thermoplastic elastomer. Furthermore, the insert element can comprise a thermoplastic material, or be composed of a thermoplastic material, respectively. The insert element can comprise polyurethane or be composed thereof, for example. The insert element can furthermore comprise a thermosetting material or be composed of a thermoset material. The compression hardness of the insert element can advantageously be set so as to depend on the sensory requirements. It is also possible for the insert element to comprise silicone, or to be composed of silicone.

Further, the decorative material layer is a natural material layer, that is to say a material layer from a natural material. The natural material layer can comprise a natural fiber material, or be composed of a natural fiber material, for example. The natural material layer can comprise leather, for example, or be composed of leather. Furthermore, the natural material layer can comprise veneer timber, or be composed of veneer timber. New avenues in terms of individualization are possible by means of the method described herein in particular in the sector of veneer forming or veneer embossing, respectively. Furthermore, the decorative material layer can comprise a cloth, for example a microfiber cloth, such as, for example, Alcantara, or be composed thereof. The decorative material layer can moreover also be formed from artificial leather or from a plastics film.

Additionally, the female embossing mold and/or the male embossing mold are manufactured by means of an additive production method. The female embossing mold and/or the male embossing mold can be manufactured by means of selective laser beam smelting, by selective laser sintering, by means of stereo lithography, by multi-jet fusion, by means of continuous liquid interface production, or by means of fused deposition modelling, for example. On account thereof, a high degree of freedom in terms of design and a high diversity in terms of variants can be achieved at low production costs. Moreover, elevation profiles between raised and depressed regions that are configured on the visible surface can be particularly readily achieved on account of the embossing tools that are manufactured by means of additive production methods. The female embossing mold and/or the male embossing mold can furthermore be milled and/or eroded.

Further, the female embossing mold and/or the male embossing mold at least have a duct and/or a porous structure for conducting a medium, or for temperature controlling and/or conditioning, respectively. During the embossing procedure, a first medium is preferably directed to a tool surface of the female embossing mold and/or of the male embossing mold. For example, the first medium can be a liquid or gaseous medium such as, for example, water, water vapor, or air. The first medium is preferably at a high temperature. On account of the first medium being directed to the tool surface, the first medium can increase the temperature of the decorative material layer without directly contacting the latter, for example, such that the decorative material layer can be more readily shaped on account of the thermal input. Alternatively, the first medium when being directed to the tool surface can contact directly the decorative material layer, for example in the form of steaming the decorative material layer with water vapor. On account thereof, the decorative material layer can be maintained so as to be ductile during the shaping procedure. The supply of the first medium can be stopped once the desired shape of the decorative material layer has been obtained.

Additionally, upon the supply of the first medium to the tool surface of the female embossing mold and/or of the male embossing mold, a second medium is directed to the tool surface of the female embossing mold or of the male embossing mold. The second medium preferably is at a lower temperature than that of the first medium. The second medium can again be a gaseous or liquid medium such as, for example, air, water vapor, or water. The second medium can either be directed to the proximity of the decorative material layer without contacting the latter, or alternatively, when being directed to the tool surface, can contact directly the decorative material layer. The desired shape of the decorative material layer can be set by means of the second medium.

A high flexibility in terms of variants at low manufacturing costs can be achieved by the method described herein. Furthermore, the inventory costs for the single-use tools can be reduced. The method is also distinguished by very short lead times at comparatively low tooling costs, on account of which individual customer requirements can be better responded to.

Furthermore specified is a decorative component which is manufactured by means of the method described herein. The decorative component can have one or a plurality of the features of the abovementioned embodiments. The features mentioned to date and hereunder can relate to both the method described as well as to the decorative component that is manufactured by means of the method.

Further, the decorative component has a decorative material layer having a visible surface and a reverse face that is opposite the visible surface. The visible surface has a raised region. The reverse face has a depressed region that is opposite the raised region of the visible surface.

The decorative component furthermore comprises an insert element which for stabilizing the raised region is disposed in the depressed region. The insert element is preferably fastened in the depressed region. For example, the insert element can be fastened in the depressed region by means of adhesive bonding. In particular, the decorative component can be an interior trim part of a passenger cabin of a vehicle.

Additionally, the insert element is manufactured by means of an additive production method. For example, the insert element can comprise a thermoplastic elastomer, in particular polyurethane, or can be composed thereof, respectively. Depending on the material and the layout of the structures, the resilience and elasticity, respectively, of the insert element are adaptable to individual customer requirements or fields of application, respectively. This can be implemented by a cellular-type construction of the insert element, for example, the properties of the latter varying depending on the cell size, cell geometry, cell wall thickness, or cell count, respectively, all of which can be predefined.

Further, the decorative material layer can have one or a plurality of depressing embossings on the visible surface. The decorative material layer in the region of the depressing embossings preferably has a thickness that is less than in adjacent regions. The depressing embossing, or the depressing embossings, respectively, can be configured in the raised region and/or in planar regions of the visible surface.

BRIEF DESCRIPTION OF THE DRAWINGS

Further objects, advantages, and novel features of the various embodiments of the method described herein and of a decorative component described herein are derived from the embodiments that are described hereunder in conjunction with FIGS. 1 to 5, in which.

DETAILED DESCRIPTION OF THE DRAWINGS

Identical component parts or functionally equivalent component parts in the exemplary embodiments and figures can in each case be provided with the same reference signs. In principle, the elements illustrated and the mutual size ratios thereof are not to be considered true to scale. Rather, for the sake of improved visualization and/or of improved clarity, individual elements can be illustrated so as to be exaggerated in terms of thickness or size dimensions.

Figure 1:
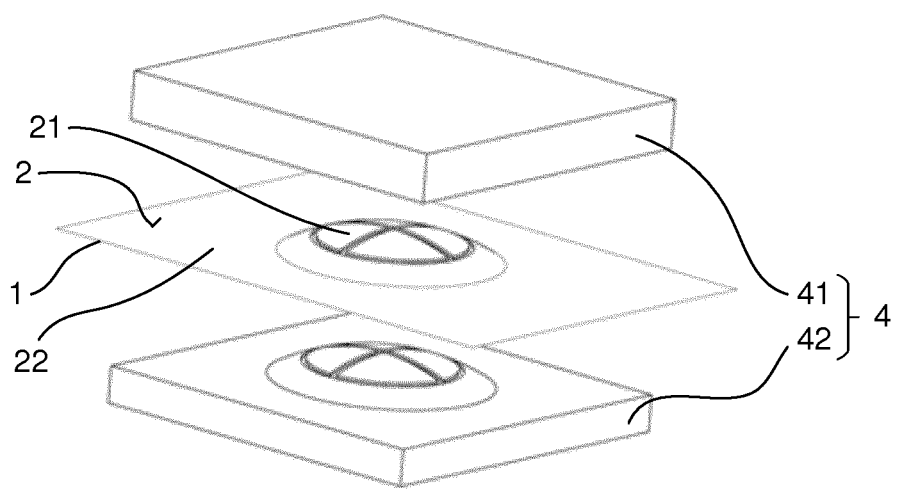
FIGS. 1 and 2 are schematic illustrations of a method described herein for manufacturing a decorative component having a raised embossed visible surface.
Figure 2:
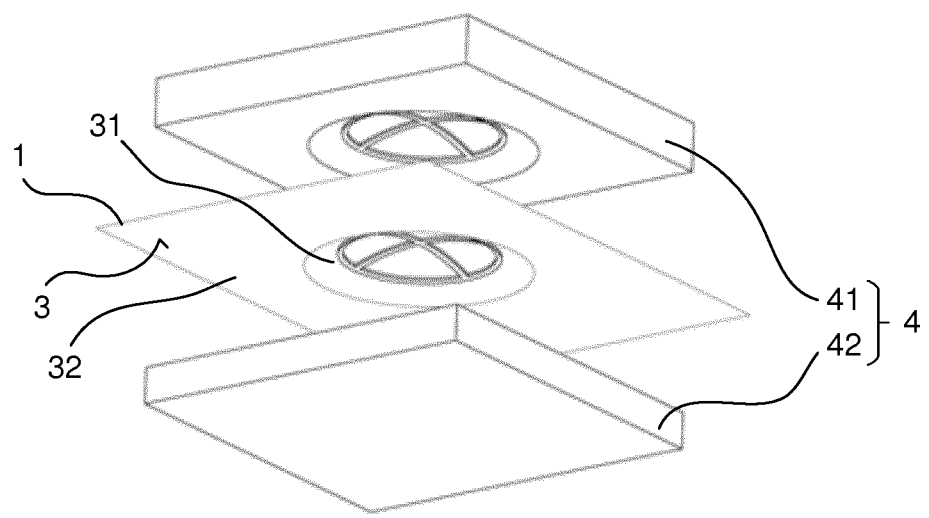

FIGS. 1 and 2 show the method described herein for manufacturing a decorative component having a raised embossed visible surface in two different perspective views. The decorative component is preferably a component of an interior trim of a vehicle.

In the case of the method, a decorative material layer 1 and an embossing device 4 which comprises a female embossing mold 41 and a male embossing mold 42 are provided. The female embossing mold 41 and the male embossing mold 42 are preferably manufactured by an additive production method such as, for example, selective laser beam smelting, by selective laser sintering, by means of stereo lithography, by multi-jet fusion, by means of continuous liquid interface production, or by means of fused deposition modelling.

The decorative material layer 1 is disposed between the female embossing mold 41 and the male embossing mold 42 in such a manner that a visible surface 2 of the decorative material layer 1 faces the female embossing mold 41, and a reverse face 3 of the decorative material layer 1 that is opposite the visible surface 2 faces the male embossing mold 42. An embossing procedure is subsequently carried out by means of the embossing device 4 such that the decorative material layer 1 after the embossing procedure on the visible surface 2 has a raised region 21 and a planar region 22 that encloses the raised region, and opposite thereto a depressed region 31 on the reverse face 3. Thereafter, an insert element (not shown) for stabilizing the raised region 21 is disposed in the depressed region 31. The insert element is preferably fastened in the depressed region 31, for example in that said insert element is adhesively bonded into the depressed region 31.

Figure 3:
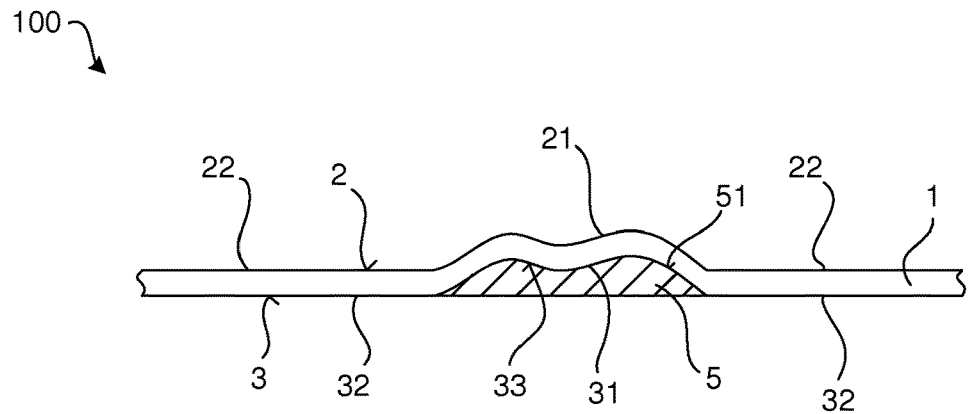
FIGS. 3 to 6 are schematic illustrations of sectional views of decorative components that have been manufactured by means of the method described herein.

FIG. 3 shows a schematic illustration of a sectional view of a decorative component 100 which is manufactured by means of the method described herein. The decorative component 100 has a decorative material layer 1 which has a visible surface 2 and a reverse face 3 that is opposite the visible surface 2. A raised region 21 is configured on the visible surface 2, and opposite thereto a depressed region 31 is configured on the reverse face 3. The raised region 21 and the depressed region 31 are preferably configured by means of an embossing device 4 which in particular can have a female embossing mold 41 and a male embossing mold 42. An insert element 5 for stabilizing the raised region 21 is disposed in the depressed region 31. In particular, the insert element 5 is adhesively bonded into the depressed region 31.

The insert element 5 is preferably manufactured by an additive production method. For example, the insert element 5 can be manufactured by selective laser beam smelting, selective laser sintering, stereo lithography, multi-jet fusion, continuous liquid interface production, or fused deposition modelling. For example, the insert element 5 can be composed of a thermoplastic, or from a thermoplastic elastomer, for example from polyurethane. Alternatively, the insert element 5 can be composed of a thermoset material or from silicone, for example.

The insert element 5 on the surface that faces the reverse face 3 has a surface contour 51 which is adapted to the surface contour 33 of the reverse face 3 in the depressed region 31. The insert element 5 is preferably connected to the reverse face 3 of the decorative material layer 1 in a form-fitting manner. A surface of the insert element 5 that faces away from the depressed region 31 preferably terminates so as to be flush with the planar region 32 of the reverse face 3.

Figure 4:
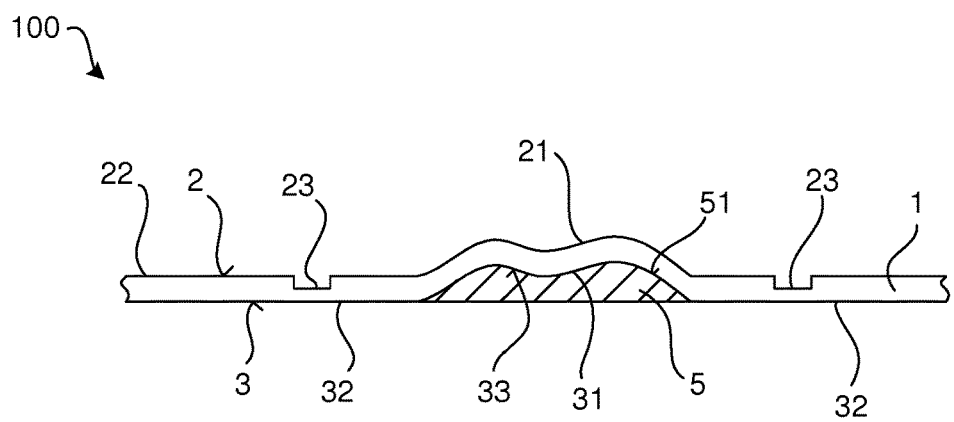

A sectional view of a decorative component 100 according to a further exemplary embodiment described herein is shown in FIG. 4. By contrast to the exemplary embodiment shown in FIG. 3, the decorative component 100 has depressing embossings 23 on the visible surface 2. The depressing embossings 23 in this exemplary embodiment are configured in particular in the planar region of the visible surface 2. The decorative material layer 1 in the regions of the depressing embossings 23 has a thickness that is less than in adjacent regions. The depressing embossings 23 that are configured on the visible surface 2 can be produced in the same method step in which the raised region 21 and opposite thereto the depressed region 31 are generated.

Figure 5:
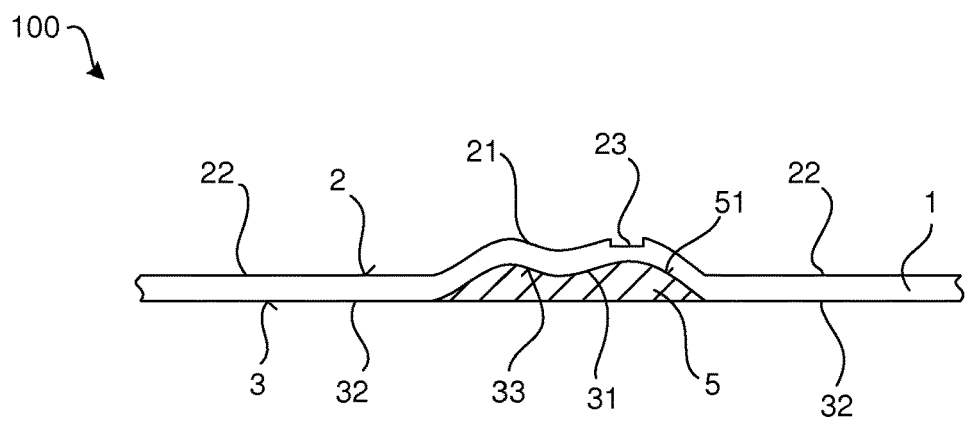

FIG. 5 shows a further exemplary embodiment of a decorative component 100, wherein as opposed to the exemplary embodiment according to FIG. 3, at least one depressing embossing 23 is configured in the raised region 21 of the visible surface 2. The decorative material layer 1 in the region of the depressing embossing 23 has a thickness that is less than in adjacent regions.

Figure 6:
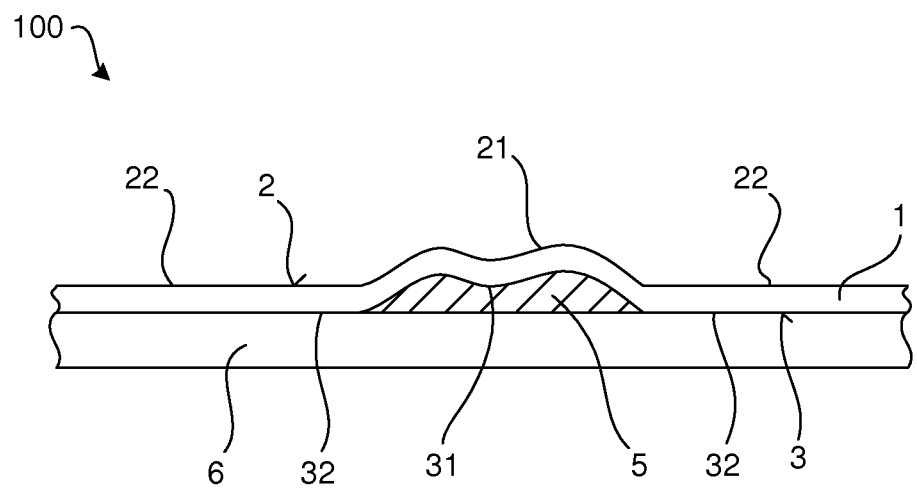

A sectional view of a decorative component 100 according to a further exemplary embodiment described herein is shown in FIG. 6. By contrast to the exemplary embodiment shown in FIG. 3, the decorative material layer 1 is connected to a carrier material 6. Preferably, the decorative material layer 1 and the carrier material 6 enclose completely the insert element 5. There are preferably no free spaces present between the insert element 5 and the carrier material 6. The carrier material 6 can be an assembly face or an upholstery material, for example.

Figure 7:
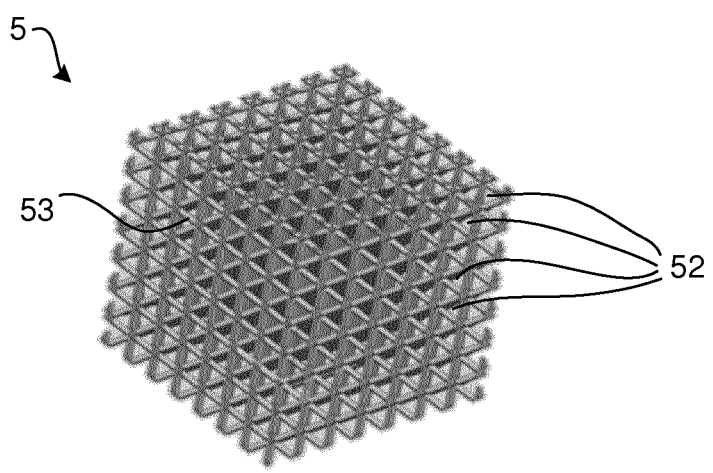
FIG. 7 is a schematic illustration of an insert element.

FIG. 7 shows a schematic illustration of an insert element 5 which has a cellular structure 53. The compression hardness and the sensory properties of the raised region 21 of the visible surface 2 of the decorative material layer 1 can be set in a targeted manner by means of the cellular structure 53 which has a multiplicity of recesses 52 which form cavities in the interior of the insert element 5. The recesses 52 can be generated during the production method of the insert element 5, for example, in particular when the insert element 5 is manufactured by an additive production method. The recesses 52 can furthermore be formed by subsequently destroyed glass spheres.

According to further exemplary embodiments, the features described in the exemplary embodiments shown can also be combined with one another. Alternatively or additionally, the exemplary embodiments shown in the figures can have further features according to the embodiments of the general specification.

LIST OF REFERENCE SIGNS

1 Decorative material layer
2 Visible surface
21 Raised region
22 Planar region
23 Depressing embossing
3 Reverse face
31 Depressed region
32 Planar region
33 Surface contour
4 Embossing device
41 Female embossing mold
42 Male embossing mold
5 Insert element
51 Surface contour
52 Recess
53 Cellular structure
6 Carrier material
100 Decorative component The foregoing disclosure has been set forth merely to illustrate the embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for manufacturing a decorative component of an interior trim of a passenger compartment having a raised embossed visible surface, said method comprising the acts of:
    providing an embossing device which has female embossing mold and male embossing mold;
    providing at least one decorative material layer;
    disposing the decorative material layer between the female embossing mold and the male embossing mold in such a manner that a visible surface of the decorative material layer faces the female embossing mold, and a reverse face of the decorative material layer that is opposite the visible surface faces the male embossing mold;
    carrying out an embossing procedure by means of the embossing device such that the decorative material layer after the embossing procedure has a raised region on the visible surface, and opposite thereto a depressed region on the reverse face;
    producing an insert element by means of an additive production method, the insert element having a predefined resilience and elasticity;
    controlling the resilience and elasticity of the insert element by changing the cell size, cell geometry, cell wall thickness, and cell count of the cellular-type construction of the insert element;
    configuring a multiplicity of recesses in the cellular-type construction of the insert element such that a predefined compression hardness of the insert element is achieved; and
    disposing the insert element for stabilizing the raised region in the depressed region of the decorative component of the interior trim of a passenger compartment, wherein
        the insert element has an elasticity modulus of less than or equal to 5.0 GPa, and
        wherein the at least one decorative material layer is made of leather and has thickness, at the embossed region, between 2 mm and 5 mm.

2. The method as claimed in claim 1, wherein an entirety of the insert element has the cell structure.

3. The method as claimed in claim 1, wherein the insert element in the interior has a multiplicity of recesses.

4. The method as claimed in claim 1, wherein the decorative material layer is configured as a natural material layer.

5. The method as claimed in claim 4, wherein the decorative material layer comprises veneer timber or is composed of veneer timber.

6. The method as claimed in claim 1, wherein the female embossing mold and/or the male embossing mold at least have a duct and/or a porous structure for conducting a medium, and wherein during the embossing procedure a first medium is directed to a tool surface of the female embossing mold and/or of the male embossing mold.

7. The method as claimed in claim 6, wherein upon the supply of the first medium to the tool surface of the female embossing mold and/or of the male embossing mold a second medium is directed to the tool surface of the female embossing mold and/or of the male embossing mold.

8. The method as claimed in claim 1, wherein
the at least one decorative material layer in a region of depressing embossings, perpendicular to a surface thereof, has a depth that is less than in immediately adjacent regions, and
the depressing embossings are provided in the raised region and in a planar region that surrounds the raised region.

9. The method according to claim 1, wherein the cellular structure of the insert element is generated by the additive production method and by using glass spheres that are subsequently destroyed and are embedded in a polymer matrix.

10. The method as claimed in claim 6, wherein
the first medium is water vapor at a first temperature, and the first medium is directed to the tool surface so as to contact directly the decorative material layer, so that the decorative material layer is maintained ductile during shaping, and
upon the supply of the first medium to the tool surface of the female embossing mold and/or of the male embossing mold, a second medium is directed to the tool surface of the female embossing mold or of the male embossing mold, the second medium being at a second temperature that is lower than the first temperature and being directed to the proximity of the decorative material layer without contacting the decorative material layer.

11. A method for manufacturing a decorative component of an interior trim of a passenger compartment having a raised embossed visible surface, said method comprising the acts of:
providing an embossing device which has female embossing mold and male embossing mold;
providing at least one decorative material layer;
disposing the decorative material layer between the female embossing mold and the male embossing mold in such a manner that a visible surface of the decorative material layer faces the female embossing mold, and a reverse face of the decorative material layer that is opposite the visible surface faces the male embossing mold;
carrying out an embossing procedure by means of the embossing device such that the decorative material layer after the embossing procedure has a raised region on the visible surface, and opposite thereto a depressed region on the reverse face;
producing an insert element by means of an additive production method, the insert element having a cell structure, wherein
the resilience and elasticity of the insert element are adaptable by changing at least one of the cell size, cell geometry, cell wall thickness, and cell count of the cellular-type construction of the insert element to predefined values;
configuring a multiplicity of recesses in the cell structure of the insert element such that a predefined compression hardness of the insert element is achieved; and
disposing the insert element for stabilizing the raised region in the depressed region of the decorative component of the interior trim of a passenger compartment, wherein
the insert element has an elasticity modulus of less than or equal to 5.0 GPa, and
wherein the at least one decorative material layer is made of leather and has thickness, at the embossed region, between 2 mm and 5 mm.

12. A method for manufacturing a decorative component of an interior trim of a passenger compartment having a raised embossed visible surface, said method comprising the acts of:
providing an embossing device which has female embossing mold and male embossing mold;
providing at least one decorative material layer;
disposing the decorative material layer between the female embossing mold and the male embossing mold in such a manner that a visible surface of the decorative material layer faces the female embossing mold, and a reverse face of the decorative material layer that is opposite the visible surface faces the male embossing mold;
carrying out an embossing procedure by means of the embossing device such that the decorative material layer after the embossing procedure has a raised region on the visible surface, and opposite thereto a depressed region on the reverse face;
producing an insert element by means of an additive production method, the insert element having a cell structure, wherein
the resilience and elasticity of the insert element are adaptable by changing at least one of the cell size, cell geometry, cell wall thickness, and cell count of the cellular-type construction of the insert element to predefined values;
configuring a multiplicity of recesses in the cell structure of the insert element such that a predefined compression hardness of the insert element is achieved; and
disposing the insert element for stabilizing the raised region in the depressed region of the decorative component of the interior trim of a passenger compartment, wherein
the insert element has an elasticity modulus of less than or equal to 5.0 GPa, and
wherein the at least one decorative material layer is made of leather and has thickness, at the embossed region, between 2 mm and 5 mm.

13. The method according to claim 1, wherein the decorative material layer in the region of the depressing embossing has a thickness that is less than in adjacent regions.

14. The method as claimed in claim 1, wherein the insert element comprises a thermoplastic elastomer.

15. The method as claimed in claim 14, wherein the insert element is glued into the depressed region.

16. The method as claimed in claim 15, wherein the insert element has a surface contour which is adapted to the surface contour of the decorative material layer in the depressed region in such a manner that no intermediate spaces are present between the decorative material layer and the insert element once the insert element has been disposed.

* * * * *